Jan. 8, 1935.                     H. KARL                     1,987,065
           MEANS FOR UTILIZING THE POWER OF THE CURRENTS IN RIVERS
                     Filed Feb. 16, 1933        2 Sheets-Sheet 1

INVENTOR
Heinrich Karl

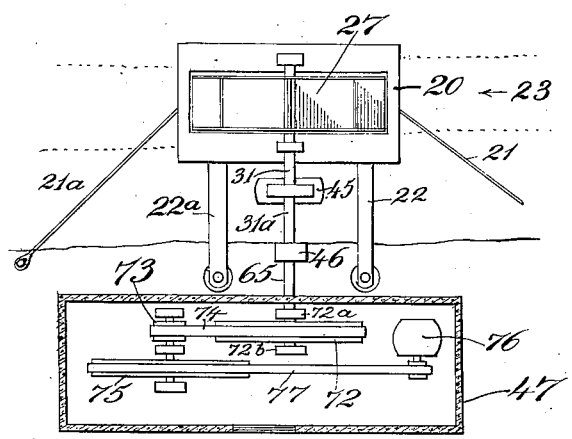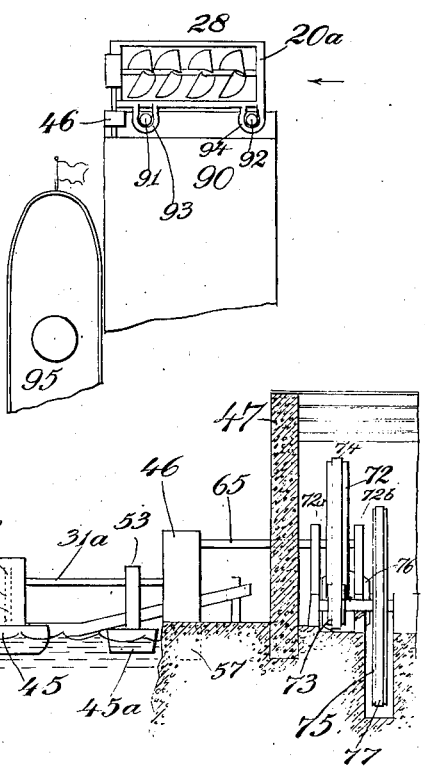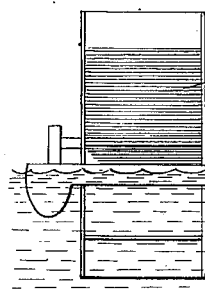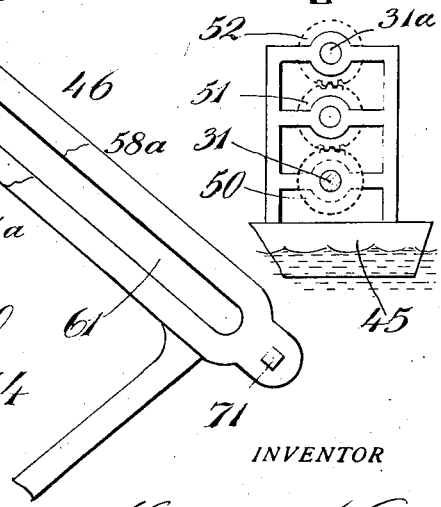

Patented Jan. 8, 1935

1,987,065

UNITED STATES PATENT OFFICE 1,987,065

MEANS FOR UTILIZING THE POWER OF THE CURRENTS IN RIVERS

Heinrich Karl, Jersey City, N. J.

Application February 16, 1933, Serial No. 657,002

12 Claims. (Cl. 170—85)

The improvements of this invention relate to devices for utilizing the currents in rivers and consist partly of water propellers or water turbines that are therefore specially constructed for that purpose. Some of these improvements consist in the simple and relatively inexpensive manner of holding said water propellers or water turbines in such positions in which they will be driven directly by the water of the current whereby floats are used on which said water propellers (water wheels) or water turbines are mounted. The floats are so held (preferably tied) that said water propellers or turbines are positioned in the current of the river. Usually water wheels, mill wheels or the like have been mounted on such places close to the shore of rivers or brooks, etc. that have sufficient fall of the water or they are directly driven by waterfalls or by the rushing water of specially built channels. However, many cities or industrial establishments which require power are not situated in the proximity of such rivers that have waterfalls and consequently such cities, etc. are deprived of economically obtainable power. There are, however, a great number of cities and towns situated on rivers and as rivers have at least in midstream or near midstream a current that suffices for turning large water propellers or turbines they will in turn give the power that creates again electric energy or which can be utilized directly for the operation of all sorts of machinery. Another of said improvements of the invention consists of the creation of a floating establishment which houses said machinery or other devices and the dynamo or dynamos that will be driven by said floating water propellers or water wheels or water turbines and this establishment consequently must be adjoining to or it must be situated very near to them. Still some of said improvements consist of specially constructed transmission devices for imparting movement from the water propeller, etc. to devices on the shore whereby special means are employed on account of the rise and the fall of the water in the river. Examples are given, however, also for other connections.

These and other improvements are described in the now following detailed description and the novelties pointed out in the attached claims.

In the drawings in which some of the preferable examples are given:

Figure 5 is a plan view of the float with water propeller to which is added an extension driving rod that is led to a building erected on the shore, and shown also in plan are such transmission mechanisms that serve for imparting with speed-increase the motion of the water propeller to a dynamo;

Figure 6 is also a top view of a float with a water turbine which is directly connected to that end of a pier that reaches into the river whereby the float and water turbine, however, can fall or rise as the water in the river falls or rises;

Figure 7 shows in elevation the devices and arrangement thereof as they are shown in plan view in Figure 5;

Figure 1:
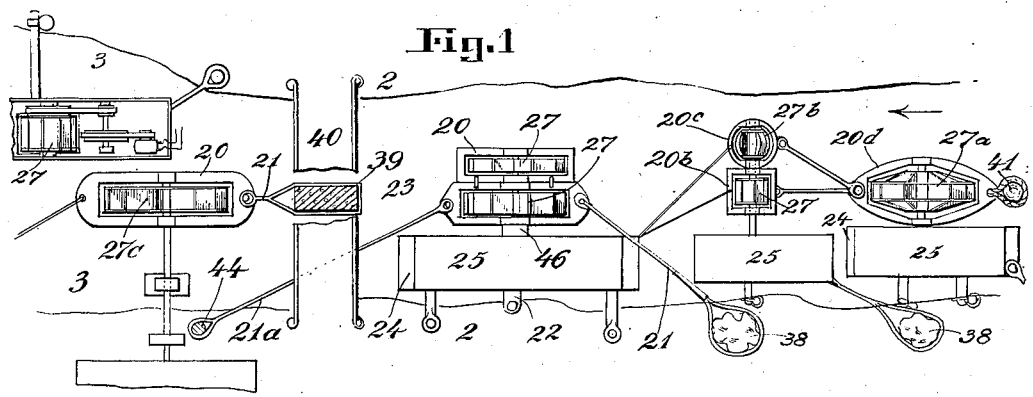
Figure 1 shows a plan view of part of a river or brook and some of the preferable methods of tying the floats on which are mounted the water propellers or turbines; in connection with some of said floats is also a floating building that houses machinery or dynamos, etc.

Figure 8 shows the preferable joint or transmission device that serves for transmitting movement from the shaft that is driven by the water propeller or water turbine to the shaft that is to drive machinery, etc. in a building that is erected on the shore of the river; and Figure 9 shows the cog-wheel arrangement that is carried by float 45 and which serves for imparting movement in the same direction to a shaft that is situated on a higher level which is also seen in Figure 7.

The most common way of deriving power from rivers or brooks that have not much fall was to build a dam so that the water would be accumulated in a reservoir. A channel was made so that the water in the reservoir had to flow through it and since the water surface in the old river bed is then lower than that in the reservoir the water flowing through the channel has sufficient fall and consequently velocity for driving a water propeller or water turbine which in turn will operate machinery or other devices in an adjoining building.

The creation of such typical arrangement is in many respects costly and can not be made in navigable rivers.

Rivers and brooks even with small fall have a current in and near midstream that suffices for the operation of water propellers or water turbines and according to the present invention floats 20 (see Figures 1, 2, 4, 5) are held so by ropes 21, 21a and logs or beams 22, 22a that they can not drift away but are held in the current indicated by 23 either in midstream or near to it. The water 3 near the shore 2 not having enough fall is mostly not adapted for operating water propellers or water turbines but other floats 24 may be tied so that they have to stay on the water at such parts that are nearer to the shore 2 and these floats 24 may carry buildings 25 that again house the machinery, etc. that is to be operated by the water propeller 27 or water turbine 28.

Figure 4:
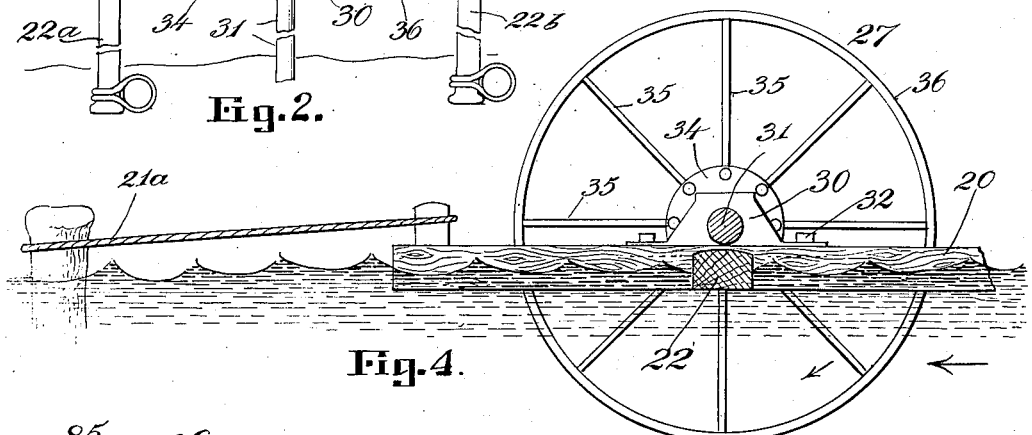
Figure 4 is an elevational view of the simplest and very effective form of a floating water propeller (water wheel) whereby part of the float and one of the means for tying it are left away; it is a slight modification of that shown in Figure 2.

Referring more particularly to the float 20, 20a, 20b, 20c, 20d and the water propeller 27 (see also Figure 4) the float itself can be made of wood or of metal as hollow pontoons (Figure 3) and can be constructed like a raft that has a large cut-out part 29 in which the water propeller 27 is to be so placed that it can turn freely without coming into friction with parts of the float. The float itself can be rectangular (20), square (20b), round (20c) or oval (20d) or of any suitable shape and the bearings 30 (see Figures 2 and 4) for the shaft 31 of the water propeller 27 are mounted and fastened to the respective parts of the float by means of screws 32 or similar fastening means. It will be noted that the shaft 31 is still above the water surface. On the part of the shaft 31 that is situated between the two bearings 30 is mounted the water propeller 27 proper. The preferable construction of the latter which resembles a paddle wheel is best shown in Figures 2 and 4. Two discs 34 are rigidly united with the shaft 31 and on the discs 34 are fastened again a number of paddle-like plates 35 of wood or metal that are equally distanced from each other in the fashion of the spokes of a wheel and are so arranged that the surface of each of the parts 35 extends in the axial direction between the two discs 34. The corners of the outer edges of the plates 35 are fastened to ring-shaped stabilizing parts 36. These ring-shaped parts 36 may, however, be arranged also differently, as, for instance, along the outer center line of the plates 35 or nearer to the discs 34. In any instance they should not be so voluminous as to prevent the water of the river from striking the plates 35 with its full impact. The water propeller may be barrel-shaped (27b, Figure 1) or it may be narrower on its circumferential line (27a). From the foregoing construction it is shown that the water propeller 27 will be turned by the current of the river provided that the float 20 on which said water propeller is mounted will be held fast by suitable means. The simplest and most practicable means therefor are ropes (preferably wire ropes) of which one is fastened at the one end and the other at the other end of the float according to the direction of the flow of the water of the river. The other end of that rope 21 that is fastened to the end of the float that bears the impact of the water may be fastened to any means suitable for holding fast that rope. It may be a rock 38 or a tree trunk on the shore 2 or the pillar 39 of a bridge 40 or it may be a pile 41 or a number of them driven into the bottom of the river (see Figure 1). The other rope 21a is suitably fastened to a pile or other means 44 on the shore, etc. The beams 22, 22a serve for holding the float off the shore and right in the current of the river or brook. There may be more than one of these beams employed.

The diameter of the water propeller depends upon the depth of the river or brook and of the circumstance of being subject to periodical rise or fall of the water such as is due at the time of the ebb or flood or during drought periods or rainy periods, respectively. Such variations in the stand of the water surface will not influence the function of the water propeller because the float 20 will always rise or fall with the surface of the water.

The shaft 31 may be extended considerably in length and even smaller floats 45 (Figures 6, 7, and 9) may be arranged for supporting that shaft on stretchers that lead over the water.

Figure 2:
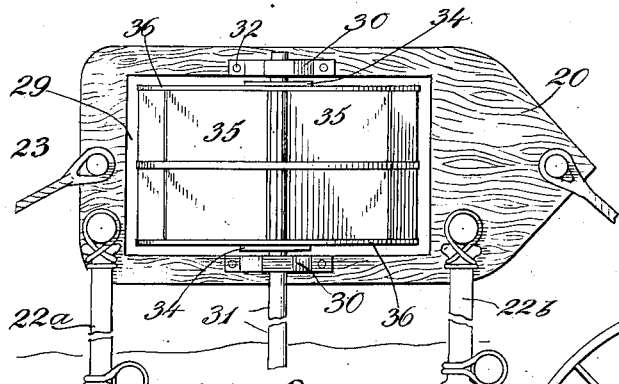
Figure 2 is a top view of a float with a water propeller (water wheel) tied to the shore by two wire ropes and held away from the shore by two beams.

If the building (25) that houses the machinery that is to be driven by the shaft 31 is built also on a float (24) as indicated in Figure 1 it will not be necessary that the shaft 31 operates a joint of special construction (a movement-imparting device as shown in Figure 8 and described later) because the float of the building will always be on the same level as the float 20 of the water propeller. The floats 20 and 24 may be united. It is, however, different when the building is situated on the shore and the movement of the shaft 31 is to be imparted to machinery, etc. in said building and in this instance at least one of said specially constructed joints 46 (see Figs. 5, 7, and 8) must be employed on the stretch between float 20 and the building 47 on the shore because the shaft 31 must adjust itself by means of these specially constructed joints to the fall or rise of the float 20 and of the additional float or floats 45. A typical arrangement is illustrated by the Figures 7 and 8 in which is shown how the shaft 31 or 31a can rise or fall according to the stand of the water in the river and despite this circumstance will impart rotary movement to a shaft (65) that is not to rise or fall. Referring more particularly to the general arrangement as it is shown in Figures 5 and 7 the shaft 31 receives a support above the float 45 as also shown in Figure 9. If it should be necessary that an additional shaft must be arranged at a somewhat higher level than that of shaft 31 for facilitating the connections with devices on the shore, a transmission gear as illustrated in Figure 9 must be employed if the shaft 31a which is that on the higher level is to revolve in the same direction as the shaft 31. Shaft 31 turns then the gear wheel 50 while this gear wheel turns the gear wheel 51 with which it is in mesh and the latter turns again the gear wheel 52 which turns then the shaft 31a.

If the shaft 31a is to turn in the inverse direction then the gear wheel 51 must be left away so that the gear wheels 50 and 52 will be in mesh. There might be already a speed increase obtained with the shaft 31a if the diameter of the gear wheel 50 is made larger than that of the gear wheels 51 and 52. Shaft 31a may have a support near its other end in form of a bearing 53 that is mounted on the float 45a. To the right-side end of shaft 31a is secured the gear wheel 54 (see Figure 8) that forms part of the specially constructed joint indicated by 46 in Figures 5, 7 and 8. This specially constructed joint is rather a device for imparting movement from a shaft that is subject to rise and fall to a shaft that remains always on the same level. This device that is best shown in Figure 8 consists of the frame 55 that comprises a central vertical part 55a that has a vertical slot 56 of a length that permits the up or downward movement of the shaft 31a as well as a side movement to a certain limited extent, (or it may be the shaft 31 if no shaft 31a is employed) according to the rise or fall of the water in the river. The frame 55 is secured to a base part 57 which again is founded in the ground of the shore as best seen in Figure 7. United with the central part 55a are inclined guide parts 58, 58a that extend outwardly and downwardly and which are provided with slots 60, 61 respectively. In slot 60 there is a cog wheel 62 so mounted that its shaft is allowed to slide in that slot and being compelled by gravity will always rest in the lowermost end of that slot if no means moves it to a higher position. Similarly is also mounted the cog wheel 63 in the slot 61 and this wheel is also compelled to assume a position in the lowermost end of slot 61 if no other means lifts it to a higher position in slot 61. On the uppermost part of the frame 55, the central part 55a, respectively, is the bearing for the shaft 65 which is the one that does not change its level. Mounted and fastened on that shaft 65 is a cog wheel 66 which must be in radial alignment with the cog wheels 54, 62 and 63 and a chain 67 similar to those used for driving gear wheels is laid so around these four cog wheels that each will be revolved in the same direction when the chain will be pulled. In order to secure at least sufficient hold for the shafts of the cog wheels 62 and 63 a duplicate of the extensions 58, 58a and of the slots 60 and 61 must be added to the extensions 58, 58a and secured thereto by means of screws 68, 69, 70 and 71. The chain 67 which is endless has such an extension in length that it allows the shaft 31 or 31a to move to the lowermost position in slot 56 that is caused by the normally lowest stand of the water in the river. And if the highest water mark is reached by the water whereby the shaft 31 (or 31a) will be at the upper end of the slot 56, the chain 67 will be slackened to a great extent between cog wheel 54 and cog wheel 62. Assuming the chain 67 will be pulled by the cog wheel 54 in the direction of the arrow 70, the cog wheel 63 will be pushed up to the uppermost end of the slot 61 and that part of the chain that leads from gear wheel 54 to the cog wheel 63 and to the cog wheel 66 will be strained and the cog wheel 66 together with the shaft 65 will be revolved thereby in the same direction as cog wheel 54 and cog wheel 63. In this instance the part of the chain 67 that leads from cog wheel 54 to the cog wheel 62 is slackened while the part of the chain 67 that leads from the cog wheel 62 to cog wheel 66 is not so much slackened because the weight of the cog wheel 62 together with its shaft pulls somewhat that part of the chain 67. It is assumed that the aforesaid movement of the device of Figure 8 is caused by the normal flow of the water in the river.

Should this device be employed in connection with a water propeller that is situated in a river near the sea where the flood causes a back flow of the water in the river the shaft 31 or 31a would be revolved in the inverse direction and consequently the chain 67 would then be strained on that side of the device on which it is normally slackened whereby the cog wheel 62 would be moved up to the upper end of the slot 60 and the cog wheel 63 would move downward. The slot 56 is purposely made wider than the diameter of the shaft 31 (or 31a) so that there may be enough freedom of movement not only in the vertical direction but also in the horizontal because it must be assumed that the floats 20, 20a can not be held completely rigid.

Referring now to the elements in the building 47, there is first a flywheel 72 seen with large diameter and is mounted in bearings 72a, 72b and which is turned by the shaft 65. Wheel 72 drives by means of an endless belt 74 another wheel 73 of a much smaller diameter. Wheel 73 is again coupled with a wheel 75 of a much larger diameter and this wheel 75 drives a dynamo 76 (see Figure 5) by means of the endless belt 77. It is herewith shown that the relatively slow turning movement of the water propeller 27 is stepwise increased until such speed is obtained that suits best for driving an electric generator.

Having described the invention in connection with the water propeller it remains only the detailed description of the water turbine proper because all those other elements described before with the exception of the water propeller can be employed also in connection with the water turbine.

Figure 3:
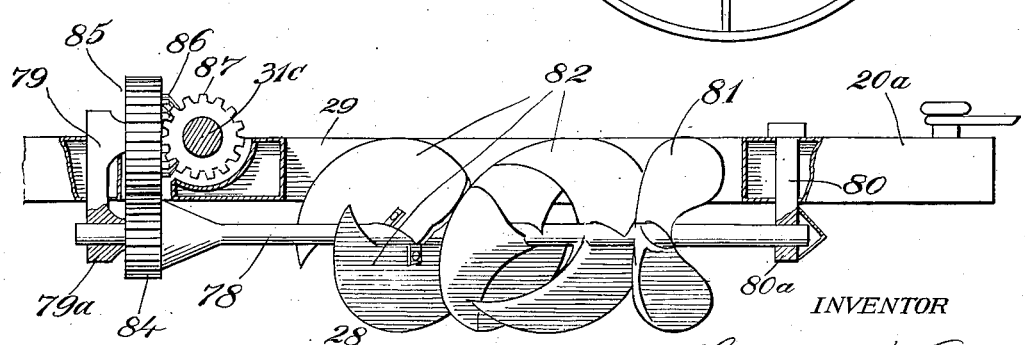
Figure 3 is a sectional elevational view of a water turbine with associated parts for imparting the propelling movement to power-requiring devices or machinery on the shore or in a floating building.

In Figure 3 where a preferable embodiment of such water turbine is shown the essential parts are as follows: A shaft 78 is held in bearings 79a and 80a in a suspended position by hangers 79 and 80, respectively. The hangers are secured to the float 20a which may be similar to the float 20 that carries the water propeller 27 and there is also a cut-out 29 necessary therewith for facilitating the inspection of the turbine or for making room for the latter. On the shaft 78 are mounted or cast together with the shaft a number of propeller-shaped blades 81 and also a number of such elements as indicated by 82 which are so shaped as to form helices. Each one of these helices is arranged separately, that is to say that no continuous spiral is created thereby because it would not so effectively respond to the impact of the water and because a single spiral-like wound blade offers too much surface on the opposite side of the blade which results in counter-pressure by the water against that opposite side of the blade. It is also advantageous not to submerge the whole part of the water turbine 28 proper for the reason to relieve back pressure, especially when the turbine is very long. It is therefore advisable to couple several water turbines side by side so that they may drive the same shaft 31c that has the same purpose as the shaft 31. Since the water turbine has its shaft 78 in the same direction as the water flows there are such transmission mechanisms necessary which will turn the shaft 31c that is arranged on a line that crosses that of the shaft 78. First there is a gear wheel 84 rigidly united with the shaft 78 and this gear wheel meshes with a gear wheel 85 to which is added a bevel gear 86 that meshes with another bevel gear 87 that is arranged on the shaft 31c. If several water turbines are employed for driving the single shaft 31c and consequently also the device 46 and the generator or machinery in the building that is floating or built on the shore, each water turbine must then have the gears (or at least adequate transmission devices), as, for instance, the geared wheels 84, 85 and the bevel gears 86 and 87.

In Figure 6 it is shown that the float 20a is directly connected to the end of a pier 90 that stretches far enough into the river where the water turbine would encounter sufficient impact of the water for its operation. In order to allow the float 20a to rise or fall in unison with the water level at least two vertical guide bars or piles 91, 92 should be provided at that end of the pier and the float 20a must then be provided with strong steel rings 93, 94 and the piles 91, 92 must then be inserted in the rings 93, 94, respectively, or the rings must be put around the guides or piles 91, 92 and afterward affixed to the float 20a. As shown there is also the device 46 employed and there may be machinery or a generator installed at that respective end of the pier 90. In order to show that the float 20a would not be in the way of a ship or lighter that has to dock at the pier 90, part of such ship is shown indicated by 95.

Under certain circumstances it may be advantageous to make the float 20 or 20a so large that not only an enormous water propeller 27, 27a, 27b, 27c, etc. or water turbine 28 can be mounted thereon but also the building erected thereto that houses the dynamos or other machinery that is to be operated by the water propeller or water turbine. In this instance all those devices that serve for imparting the revolving motion of the water propeller, etc. to devices on the shore or to another float would not be needed but simply a transmission, well known, that increases the speed if dynamos are to be driven. An arrangement in that sense but on a small scale is shown at the extreme left of Figure 1. The float itself may be composed of two different parts, as, for instance, two rafts held together by logs, etc. and the water propeller or turbine must be suitably arranged between them in a similar way as shown in Figure 7.

Having described my invention, what I claim is:

1. The combination in a system for utilizing the currents in rivers including a float and a device mounted thereon that is adapted to be revolved by the water of the current in the open river, a shaft operatively connected with said device and extended over the board of said float to a building containing mechanical devices, another device in connection with said building adapted for holding the end part of the extension of said shaft and permitting said shaft and extension thereof freedom of movement not only due to the rise and the fall of the water in the river but also all those movements caused by the waves of the water in the river including all the short vertical, horizontal and such movements between the vertical and horizontal directions including those in the axial direction of said shaft and means in connection with said other device for operating said mechanical devices.

2. In a system for utilizing the currents in rivers including a float and a device mounted thereon that is adapted to be revolved by the current in the open river, another float individually different from said first named float secured in the vicinity of said first named float and carrying a building that houses mechanical devices, and a shaft operable by said first named device extended to said other float and operatively connected with said mechanical devices in said building and a device in connection with said shaft adapted to hold the extension of said shaft and at the same time to allow the freedom of movement to said shaft and its extension not only in the vertical and horizontal directions but also in such directions between these including the axial direction of said shaft.

3. In a system for utilizing the currents of rivers including a float and a device thereon adapted to be revolved through the current of the water in the river, and a flexible means for tying said float to a rigid part for preventing the float from drifting away, non-flexible parts tied to said float and being of such extension as to hold said float in the current of the river, and means for affixing said non-flexible parts to said float and to rigid parts on the shore of the river.

4. In a system for utilizing the currents in rivers, a float and a device mounted thereon that is revolvable through the impact of the water in the current of the river, a shaft operatively connected with said device, a building structurally independent from said float and devices therein operatively connected to another shaft, and a device operatively connected with both shafts and adapted for imparting the movement of said first named shaft to said other shaft also when said first named shaft departs from its normal position and level due to rocking movements of the float.

5. The combination in a system for utilizing the currents in rivers, of a float and a shaft mounted thereon together with a device that is adapted to be revolved by the water of the current in the river, a second shaft geared to said first named shaft and held by bearings in a more elevated level than the first named shaft, both shafts supported by bearings mounted on floats in said river, a building on the shore, and devices therein operatively connected to another shaft with stable bearings and this shaft again operatively connected to said second shaft by means of a transmission device completely constructed of metal, said transmission device adapted to permit said second shaft to fall or rise and to displace itself also somewhat laterally without interrupting the operation of said shafts and devices.

6. In a system for utilizing the currents in rivers, a number of floats tied side by side together and each having a device mounted thereon that is adapted to be revolved by the water of the current in the river, a shaft operatively connected to all of said devices, and other devices also operatively connected with said shaft and driven thereby.

7. In a system for utilizing the currents in rivers for the production of electric current in a building on the shore, including a float in the river and a device mounted thereon that is adapted to be revolved by the water of the current in the river, a shaft operatively connected with said device extended over the water to the shore by means of extensions and said extensions supported by other floating devices in the river, another shaft and a flywheel operatively connected with said first shaft by means of a movement-transmitting device.

8. In a system for utilizing the currents in rivers including a float and mountings thereon such as bearings and means for fastening them to the float together with a water propeller including a shaft revolvably mounted in said bearings, said water propeller constituted by disk-like means secured on said shaft and plates fixed on said disk-like means and held also by circumferentially arranged stabilizing means, said plates each extended as far as to get the possibly largest surface exposed to the impact of the water.

9. In a system for utilizing the current in rivers including a revolvable shaft and a device that is revolvable through the impact of the water in a river whereby said shaft is subject to movements caused by the water, said shaft extended and another device having a slot for holding the extended end of said shaft, said slot adapted to permit said shaft to move up and down according to the fall and rise of the water in the river and to allow also other movements incidental to movements of said shaft including the movement in the axial direction of said shaft.

10. In a system for utilizing the current in rivers including a revolvable shaft and a device that is revolvable by the impact of the water in a river whereby said shaft is subject to movements caused by the water, said shaft extended and the extended end thereof provided with a cog wheel and a chain meshed with said cog wheel and with another cog wheel of another shaft and means for adjusting said chain to force said chain to grip said two cog wheels in any of the positions said first named shaft may take.

11. In a system for utilizing the current in rivers including a revolvable shaft and a device that is revolvable by the impact of the water in a river whereby said shaft is subject to movements caused by the water, another revolvable shaft and a chain for imparting the rotating movement of said first named shaft to said other shaft and cog wheels mounted in slots and engaged by said chain and adapted to place said chain in such position as to impart rotating movement from said first named shaft to said other shaft in either revolving direction.

12. In a system for utilizing the currents in rivers including a revolvable horizontally directed shaft that is subject to movements caused by the water in the river and a device that is revolvable by the impact of the water in the river and which cooperates with said shaft, a device having a central vertical slot and two other slots but inclined, flanking and downwardly diverging from the central vertical slot, the central vertical slot adapted to hold said shaft and to allow the up and downward movement thereof and such movements that are caused by the moving water, and the said two other slots each adapted to hold a cog wheel by means of an extension on the latter, said cog wheels engaged by a chain and adapted to slide in their respective slot up and down and thus prevent said chain from sagging, and two other cog wheels engaged by said chain and adapted to be revolved in both directions.

HEINRICH KARL.